G. T. STAMM.
FRUIT DRIER.
APPLICATION FILED JAN. 28, 1913.
1,078,110.
Patented Nov. 11, 1913.
3 SHEETS—SHEET 1.
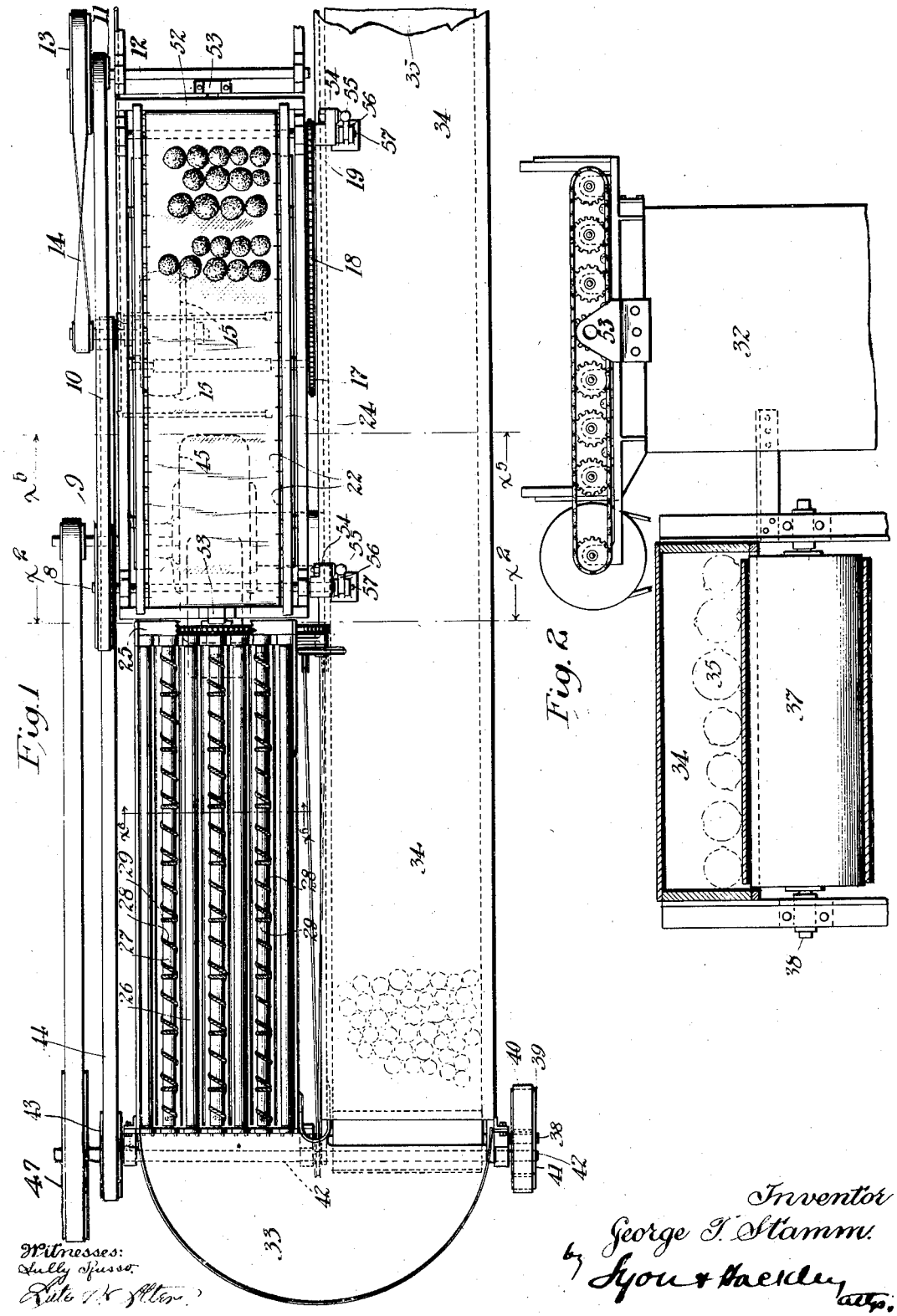
Inventor
George T. Stamm.

G. T. STAMM.
FRUIT DRIER.
APPLICATION FILED JAN. 28, 1913.
1,078,110.
Patented Nov. 11, 1913.
3 SHEETS—SHEET 2.
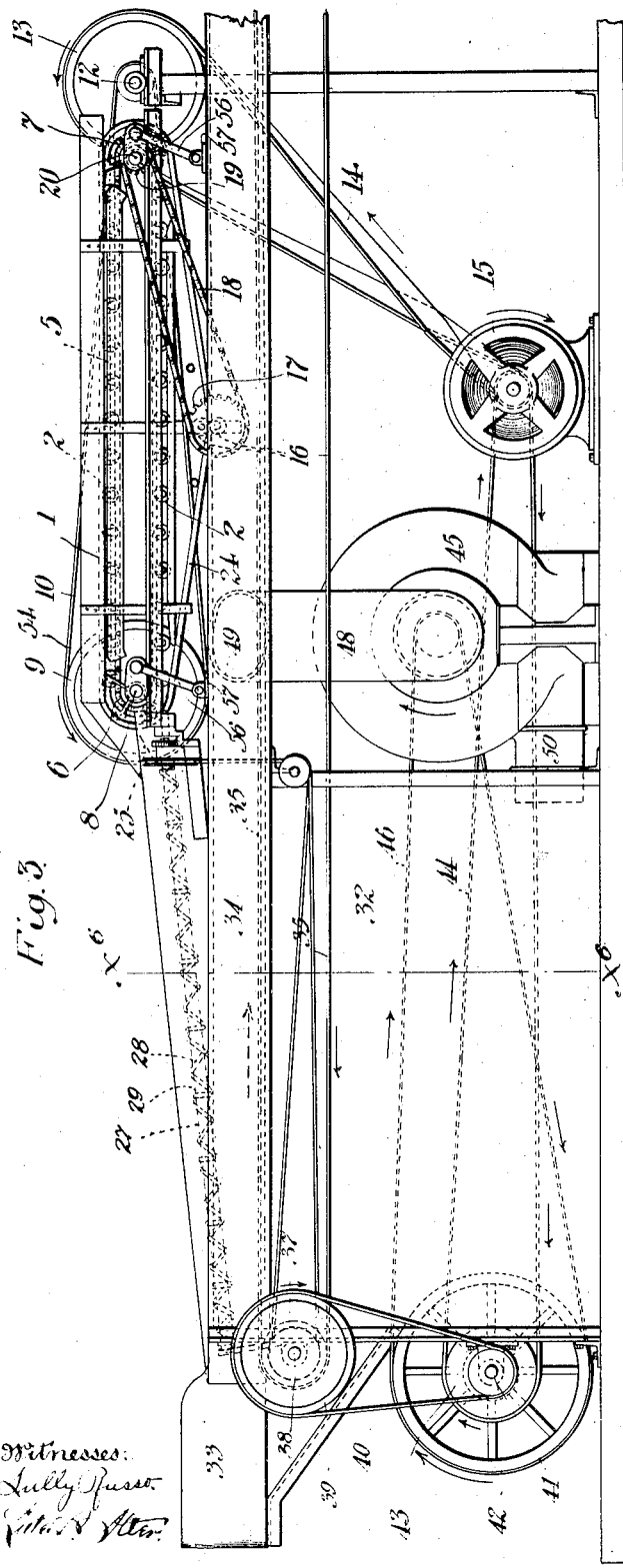
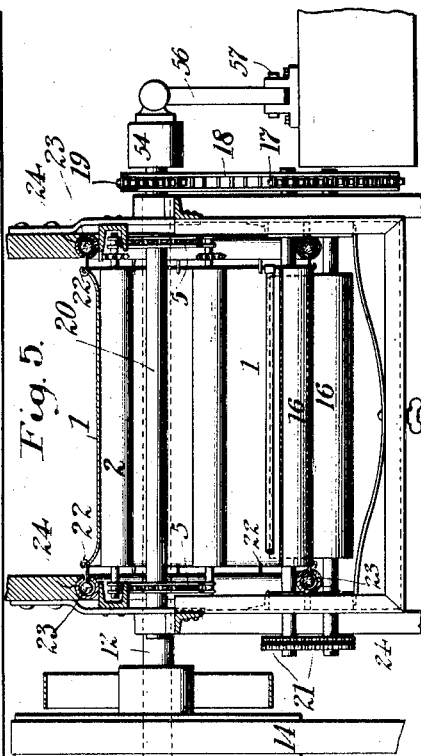
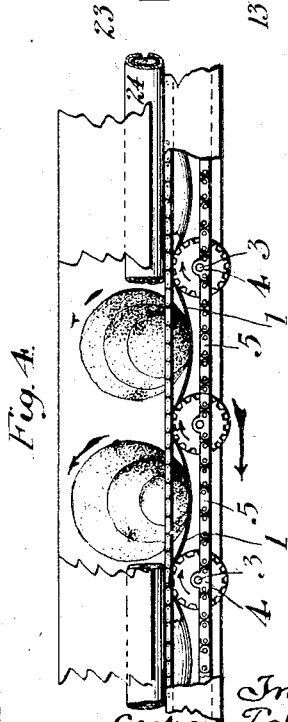

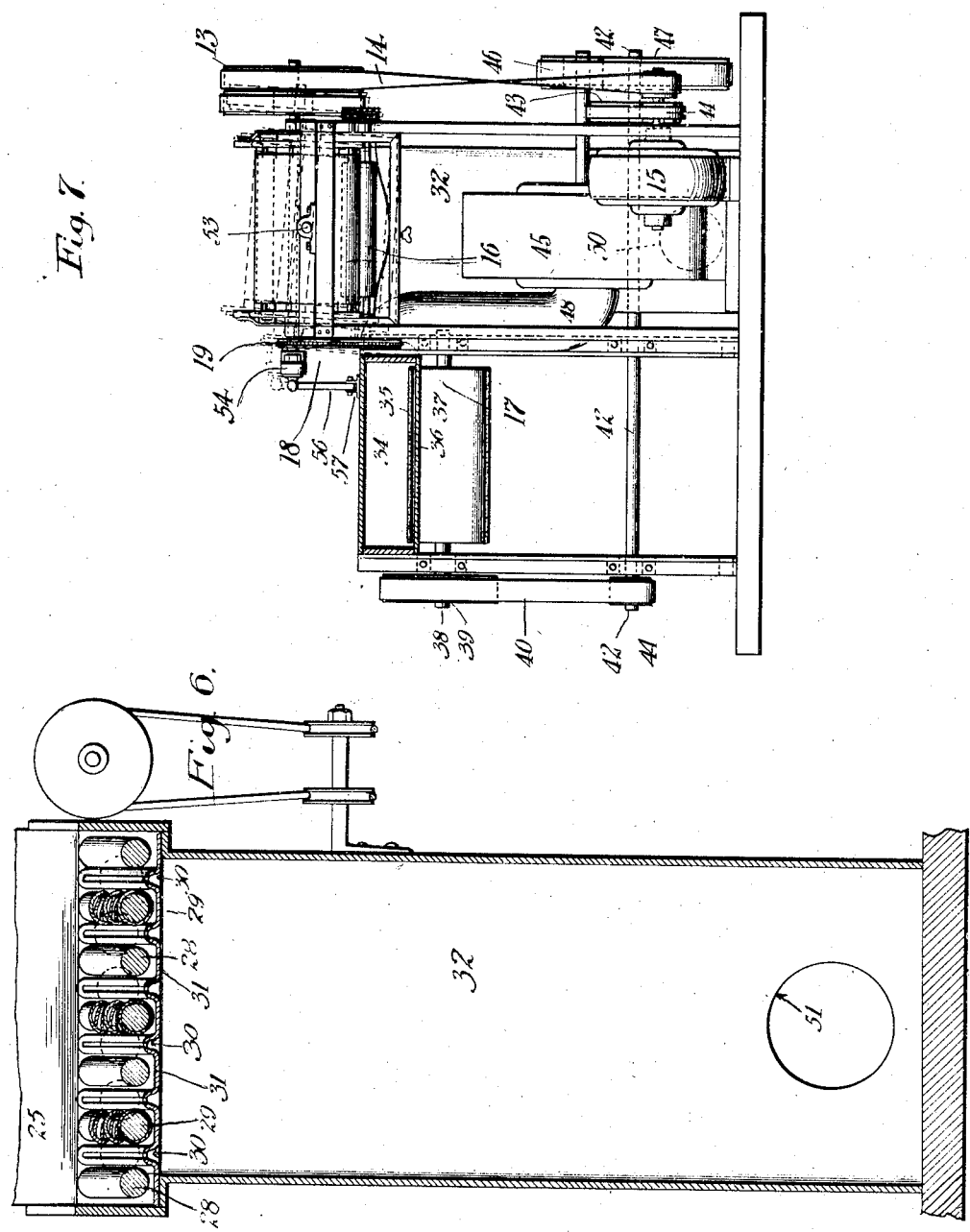

UNITED STATES PATENT OFFICE.

GEORGE T. STAMM, OF UPLAND, CALIFORNIA.

FRUIT-DRIER.

1,078,110.  Specification of Letters Patent.  Patented Nov. 11, 1913.

Application filed January 28, 1913. Serial No. 744,766.

*To all whom it may concern:*

Be it known that I, GEORGE T. STAMM, a citizen of the United States, residing at Upland, in the county of San Bernardino, State of California, have invented a new and useful Fruit-Drier, of which the following is a specification.

This invention relates to a machine for drying oranges or other fruit.

Great difficulty is encountered in drying navel oranges on account of water, which collects in the navel, and which is not easily removed, and one of the main objects of the present invention is to dry such oranges as quickly as others.

I provide an absorbent material to absorb moisture from the oranges, and one of the objects of the invention is to secure a large area of contact between the orange and such absorbent material and cause a continuous rolling movement of the fruit over the absorbent material.

Another object is to subject the oranges in two situations to a draft of air and to utilize the same air in both situations, thereby obtaining maximum absorption from a given amount of air.

Another object is to provide for completely turning the oranges as they are subjected to the first air blast.

Another object is to construct the machine of compact form, and to completely dry the oranges in minimum time.

Other objects and advantages will be brought out in the following description.

Referring to the drawings: Figure 1 is a plan view. Fig. 2 is a section on line $x^2$—$x^2$, Fig. 1. Fig. 3 is a side elevation. Fig. 4 is an enlarged side elevation of a portion of the machine with part broken away, showing the contact of the oranges with the absorbent support. Fig. 5 is an end view of the upper portion of the machine. Fig. 6 is a section on line $x^6$—$x^6$, Fig. 3. Fig. 7 is an end elevation of the drier.

The oranges to be dried are first delivered upon an absorbent sheet 1 formed, for example, of toweling. The sheet 1 is supported by rollers 2 in such a manner that it sags down between the rollers 2, as clearly shown in Fig. 4, and the fruit rests in the transverse concavities formed, which gives maximum contact of the fruit with the toweling and serves to remove the greatest possible amount of moisture during the time the fruit is in contact with the sheet. The sheet 1 is not a conveyer, and in fact travels in a direction opposite to the direction of movement of the fruit, and acts solely as an absorbent element to move the greater amount of water therefrom. Right here is to be noted a prominent difference over devices of similar character, in that the movement of the fruit is accomplished by the progression of the concavities in the sheet, acting similarly to the travel of a wave in water. The fruit which rests in these concave depressions is rolled along as the depression travels, so that the rolling motion of the fruit over the absorbent sheet brings practically the entire surface of the fruit in contact with the sheet many times during the travel of the fruit over the sheet. I have found in practice that this is very effective in removing the water from the fruit, because the bodily traveling motion of the rollers results in producing a continuous rolling movement of the oranges upon the surface of the absorbent element. Where in the prior art the absorbent element is employed as a traveling conveyer to carry the fruit along with it, the fruit does not roll upon the conveyer, but rests at one point thereon, so that only a very small area of the surface of the fruit has contact with the absorbent element. Even where bumping devices are introduced to change the position of the fruit, a very large part of the surface of the fruit does not have any contact with the absorbent element. This is avoided in my construction.

The rollers 2 are mounted on shafts 3, which are journaled in links 4 in chains 5, driven by sprockets 6 and 7. The sheet 1 is caused to travel in an opposite direction to the direction of the travel of the fruit as will be explained, and in order to frictionally drive the sheet at its contact with each roller, I provide on one end of each roller a sprocket 6, the pitch diameter of which is somewhat less than the outside diameter of the roller, which meshes with a stationary chain 7, the chain 7 acting as a rack to cause rotation of each sprocket 6 and associated roller as the roller is moved along bodily by the chain 5. Thus, it will be seen, referring to Fig. 4, that the rollers 2 travel in the direction of the arrow bodily and also have an axial clockwise rotation, tending to drive the sheet 2 in a direction opposite to the arrow, while the fruit moves bodily along in the direction of the arrow in the progression of the concavities of the sheet. By this means there is imparted to the fruit a continuous rolling movement of the fruit over the absorbent material. By causing the sheet to travel in the opposite direction I bring a greater amount of its surface in contact with the fruit than if it were to remain passive or substantially stationary while the fruit traveled over it. This produces a greater speed of rotation of the fruit and consequently the fruit is rolled over and over twice as much as it would if the sheet were stationary.

The sprocket 6 is mounted on a shaft 8, carrying a pulley 9, driven by a belt 10, from a pulley 11, on shaft 12. Shaft 12 has a pulley 13 which is driven by a crossed belt 14, from a motor 15.

In order to remove the water which is taken up by the absorbent sheet, I pass the sheet through a wringer, consisting of two rollers 16, the lower of which carries a sprocket 17 driven by a chain 18, from a sprocket 19, on shaft 20, on which the sprocket 7 is mounted. The rollers 16 have gears 21, which cause them to revolve in unison.

To maintain the sheet 1 in proper position and prevent it from sagging, except at the transverse places intended, I provide hooks 22 which engage in the sheet near each edge thereof, the hooks being secured to cables 23, which ride in conduits 24.

After reaching the end of the sheet 1 the fruit rolls down an inclined board 25, and is delivered onto an inclined support where it is subjected to a blast of air which blows the water out of the navel or other recesses. This inclined supporting means comprises a series of pairs of longitudinal rods, each pair consisting of a plain rod 26 and a propelling rod 27. Each propelling rod 27 is wound with a rope 28 to form a series of spiral projections, with occasional transverse projections 29, which extend annularly. This is produced by first winding the rod continuously with the rope and then at intervals rearranging certain of the coils so that they stand transverse, as shown at 29, and thence securing such coils in that position and spacing the other coils properly. As clearly shown in Fig. 6 a series of longitudinal slots 30 are provided in a plate 31, each slot 30 extending parallel with and between the two rods of each pair. These slots form elongated mouths through which the air is projected against the fruit which is traveling along down the rods. The plate 31 forms the upper wall of a box 32, in which compressed air is delivered as will be described. The fruit rolls down on the rods 26 and 27 by gravity, assisted by the spiral windings of the rope, and as it travels along down it is rolled around so that its entire surface is ultimately subjected to the blast of air, which removes the water. In order to insure that the fruit is completely turned in all directions, I provide the transverse coils 29. These are so arranged that when a piece of fruit arrives at a coil 29, its movement is arrested and the fruit must travel up over the coil 29 before it can proceed. This interruption and enforced travel of the fruit over a coil 29 causes the fruit to positively change position. Before it reaches the lower end of the rods, and during its travel, every portion of the surface of the fruit has been exposed several times to the blast of air, which issues through the slots 30. The fruit then passes onto a semicircular table 33, and is conducted to a longitudinal drying box 34, where it receives its final drying. The fruit is caused to travel through the box 34 solely by means of a conveyer belt 35, on which the fruit rests, the upper run of the belt 35 resting on the bottom 36 of the box 34. The belt 35 is carried by rollers 37, one of which is idle and not seen in the drawings on account of being broken away. The other run is mounted on a shaft 38, having a pulley 39, driven by a belt 40, from a pulley 41, on a shaft 42, having a pulley 43, driven by a belt 44, from the motor 15.

A blower 45 is driven by a belt 46, from a pulley 47, on shaft 42, and its inlet pipe 48 communicates with one side of the chamber 34 at 49, as shown in Fig. 3, also see Fig. 7. The chamber 34 is open at both ends so that a draft of air is produced in the chamber 34 from each end thereof toward the orifice 49, where this air passes down through inlet pipe 48, into the blower 45. The outlet pipe 50 of the blower discharges into the chamber 32, through the orifice 51, as shown in Fig. 6, see also Fig. 3, and from the box 32 the air issues upwardly through the slots 30 and against the fruit on the inclined support and thence passes off. It will thus be seen that the air is utilized twice; first, in its passage through the chamber 34 where the air is fresh and comes in contact with the nearly dry fruit, so that the fresh air takes up some moisture in the chamber 34. Then this air, laden only slightly with moisture is driven into the chamber 32, and thence out through the slots 30 against the fruit on the inclined conveyer where this air blows the water from the oranges on the inclined support.

The fruit in moving over the absorbent sheet is given a rolling movement transversely of the sheet by rocking the sheet and adjacent parts as indicated in Fig. 7. This is accomplished as follows: Shafts 8 and 20 are mounted in a frame 52, which is pivoted at each end at 53, as clearly shown in Fig. 1, see also Fig. 7, and cranks 54 are secured to the ends of shafts 8 and 20, the cranks 54 being connected by universal joint 55, with pitmen 56, which are pivoted at stationary points 57. Thus, as the shafts 8 and 20 rotate the cranks 54 rotate and are caused by the pitmen 56 to alternately raise and lower shafts 8 and 20, thereby imparting a transverse rocking motion to the frame 52, which supports the sheet. All of the other elements which are carried by the frame 52 are also thus rocked bodily including the pulley 12, but the movement is not so great as to cause the belt 14 to run off. This transverse rocking motion of the absorbent sheet rolls the fruit back and forth in the concave depressions in the sheet so that in its progression over the sheet, the fruit rolls in two directions with respect to the sheet, i. e. longitudinally and laterally, with the result that practically the entire surface of the sheet is utilized in removing the water from the fruit.

What I claim is:

1. In a fruit drier, an absorbent element, and means for imparting a continuous rolling movement of the fruit over said absorbent element.

2. In a fruit drier, an absorbent element, means for imparting a continuous rolling movement to the fruit longitudinally of the said absorbent element, and means for causing the fruit to roll laterally on the absorbent element.

3. In a fruit drier, an abosrbent element, means for imparting a continuous rolling movement of the fruit over the absorbent element, and means for rocking the absorbent element transversely to cause a transverse rolling movement of the fruit.

4. In a fruit drier, an absorbent element, means for supporting said element at different points to cause the absorbent element to sag between such points and form transverse depressions adapted to receive fruit, and means for moving said supporting means along the absorbent element to cause a progression of the said depressions in the absorbent element and cause the fruit which lies in said depressions to roll along on the absorbent element in the traveling depressions therein.

5. In a fruit drier, an absorbent sheet, a series of rollers under the sheet supporting the same, with depressions between the rollers, said depressions adapted to receive the fruit, and means for moving said rollers along said sheet to cause a progression of the depressions and thereby roll the fruit along the sheet.

6. In a fruit drier, an absorbent sheet, a series of rollers under the sheet supporting the same, with depressions between the rollers, said depressions adapted to receive the fruit, means for moving said rollers along said sheet to cause a progression of the depressions and thereby roll the fruit along the sheet, and means for moving said sheet in a direction opposite to the movement of the rollers to increase the rotative motion of the fruit.

7. In a fruit drier, an absorbent sheet, a series of rollers under the sheet supporting the same, with depressions between the rollers, said depressions adapted to receive the fruit, means for moving said rollers along said sheet to cause a progression of the depressions and thereby roll the fruit along the sheet, and means for rocking said rollers and sheet transversely to cause the fruit to roll laterally in said depressions in addition to the longitudinal rolling movement of the fruit.

8. In a fruit drier, an absorbent element, means for imparting a continuous rolling movement of the fruit over the absorbent element, an inclined element comprising a pair of rods adapted to support fruit delivered from the absorbent element, means for projecting a blast of air between said rods to remove the water from the fruit, and means for rotating said rods to roll the fruit thereon as it travels down the rods.

9. In a fruit drier, an absorbent element, means for imparting a continuous rolling movement of the fruit over the absorbent element, an inclined element comprising a pair of rods adapted to support fruit delivered from the absorbent element, means for projecting a blast of air between said rods to remove the water from the fruit, means for rotating said rods to roll the fruit thereon as it travels down the rods, and a rope wound spirally on one of said rods and arranged with transverse coils at intervals to cause a progression of the fruit and periodical change of position of the fruit.

10. In a fruit drier, means for removing considerable water from the fruit, an inclined supporting element arranged to receive fruit from the first means, said inclined element comprising a series of pairs of rods, the rods of each bar comprising a plain rod and a rod with a rope wound spirally thereon, said rope being arranged with transverse coils at intervals, a box below said rods, a top for the box, the top being formed with a plurality of mouths arranged longitudinally in the center between the respective rods, and means for forcing air into said box to cause the same to be projected through said mouths against the fruit on said rods.

11. A fruit drier, comprising means for removing considerable moisture from the fruit, means receiving fruit from the first means for projecting a blast of air against the fruit to remove additional moisture, a box for receiving fruit from the second means, means for maintaining a current of air through said box to remove the remaining moisture from the fruit within said box, and means for moving the fruit through said box.

12. A fruit drier, comprising means for removing considerable moisture from the fruit, means receiving fruit from the first means for projecting a blast of air against the fruit to remove additional moisture, a box for receiving fruit from the second means, means for maintaining a current of air through said box to remove the remaining moisture from the fruit within said box, means for moving the fruit through said box, and means for conducting the said moving air in said box to the second means to supply the air blast for the second means.

13. In a fruit drier, a sheet of absorbent material, a plurality of rollers supporting said sheet to form lateral depressions therein, means for moving said rollers bodily to cause a progression of said depressions and consequent rolling movement of the fruit in said depressions, and means for wringing the moisture from said absorbent sheet.

14. In a fruit drier, an absorbent sheet, a plurality of rollers supporting said sheet with sagging portions between the rollers adapted to receive fruit, means for moving said rollers bodily to cause a progression of the depressions and consequent rolling movement of the fruit over the sheet, and means engaging in the edges of the sheet for holding the same from stretching transversely.

15. In a fruit drier, a sheet of absorbent material, a plurality of rollers supporting said sheet to form lateral depressions therein, means for moving said rollers bodily to cause a progression of said depressions and consequent rolling movement of the fruit in said depressions, and means for wringing the moisture from said absorbent sheet, and means for repeatedly turning the fruit in its travel through such blast.

In testimony whereof, I have hereunto set my hand at Los Angeles, California this 15th day of January 1913.

GEORGE T. STAMM.

In presence of—
GEORGE T. HACKLEY,
MARTHA M. LANGE.